United States Patent [19]

Uraneck et al.

[11] 3,956,232

[45] May 11, 1976

[54] PREPARATION OF ORGANOMETAL TERMINATED POLYMERS

[75] Inventors: Carl A. Uraneck; Richard L. Smith, both of Bartlesville, Okla.

[73] Assignee: Phillips Petroleum Company, Bartlesville, Okla.

[22] Filed: July 1, 1974

[21] Appl. No.: 484,692

Related U.S. Application Data

[60] Division of Ser. No. 307,773, Nov. 20, 1972, which is a continuation of Ser. No. 92,214, Nov. 23, 1970, abandoned.

[52] U.S. Cl. .......................... 260/42.32; 260/42.37; 260/42.47; 526/1; 526/20; 526/44; 526/240; 526/340
[51] Int. Cl.² ...................... C08C 19/26; C08F 8/42
[58] Field of Search ................. 260/94.7 S, 94.7 A, 260/94.7 HA, 94.7 N, 94.2 R, 94.2 M, 42.32, 42.37, 42.47, 85.1; 450/610.5, 611, 615, 618, 619

[56] References Cited

UNITED STATES PATENTS

| 3,674,753 | 2/1972 | Uraneck................. 260/94.7 HA X |
| 3,692,874 | 9/1972 | Farrar et al. .................... 260/880 B |
| 3,704,286 | 11/1972 | Schafer et al. ................. 260/94.7 R |

FOREIGN PATENTS OR APPLICATIONS

| 1,451,554 | 7/1966 | Germany .......................... 260/94.7 |
| 992,210 | 5/1965 | United Kingdom................ 260/94.7 |

*Primary Examiner*—William F. Hamrock

[57] ABSTRACT

Alkali metal or alkaline earth metal terminated rubbery polymers are reacted with monofunctional hydrocarbyl organometal compounds in which the metal is selected from Groups 2b, 4a, and 5a and which contain either halogen, —OR, —SR, or —N(R)$_2$. The resulting rubbery polymers have improved physical properties in gum or filled stocks.

14 Claims, No Drawings

PREPARATION OF ORGANOMETAL TERMINATED POLYMERS

This application is a divisional application of Ser. No. 307,773, filed Nov. 20, 1972, now allowed, which is a continuation application of Ser. No. 92,214, filed Nov. 23, 1970, now abandoned.

This invention relates to polymers with improved terminal groups. In another aspect, it relates to a method of improving polymer properties without coupling.

It is known that polymers containing alkali metal or alkaline earth metal termination groups can be treated with various difunctional or polyfunctional reagents to result in coupled linear or branched polymers of increased molecular weight. These coupling processes provide polymers of improved processing and other properties due to the increase in molecular weight and to the branching. It is not always desirable, however, to have the increase in molecular weight. It would be desirable to be able to improve the processing properties without having to multiply the molecular weight.

We have discovered that treatment of polymers containing terminal reactive alkali metal or alkaline earth metal groups with certain monofunctional organometal compounds results in polymers which, although essentially not coupled or branched, demonstrate highly improved properties in gum stocks or filler-containing stocks.

These new terminating compounds are monofunctional organo compounds of metals of Groups 2b or 4a or 5a of the Periodic Table and contain at least one hydrocarbyl radical, and one of halogen, —OR, —SR, and/or —N(R)$_2$.

The rubbery polymers prepared according to our invention demonstrate improved properties in either gum stock or filler loaded stocks when compared to control polymers not containing our new terminal organometal groups. In particular, the stress-strain and dynamic properties are improved. Such improvements in the prior art are usually indicative of a higher degree of cure or vulcanization and commonly are accompanied by an undesirable increase in the hardness of the stocks. With the polymers of our invention the improvement in properties is often not made at the expense of an increase in hardness. In fact, the stocks containing certain polymers of our invention often are even softer than the control polymers.

Another surprising result of our invention is the significant increase in filler-polymer interaction obtained with the polymers of this invention in filler loaded stocks. In particular, bound rubber measurements demonstrate that the polymers of this invention having terminal $R_{(z-1)}M$— groups are much more extensively bound to the fillers employed than the control polymers. Furthermore, it was surprisingly found that elastomeric block polymers having terminal resinous polymer segments demonstrated improved stress-strain properties in filler loaded compounds, when such polymers were made according to this invention. It is known that prior art block polymers with resinous terminal segments do not respond favorably toward added fillers as do typical elastomers in the improvement of stress-strain properties.

It is an object of our invention to provide polymers with improved processing properties by converting alkali metal or alkaline earth metal terminal groups to improved terminal groups. Another object of our invention is to provide polymers with improved terminal groups.

Other aspects, objects, and the several advantages of our invention will be apparent to one skilled in the art to which our invention most nearly pertains from our description and appended claims.

The polymers containing the terminal reactive alkali metal or alkaline earth metal groups which are treated according to our invention are generally rubbery polymers obtained by the polymerization of conjugated dienes alone or in admixture with vinylidene group-containing monomers employing alkali metal- or alkaline earth metal-based catalysts.

According to our invention, rubbery polymers having terminal reactive alkali metal or alkaline earth endgroups are reacted with organometal compounds of the general formula $R_{(z-1)}MX$. In this formula, R is a hydrocarbon radical containing from 1 to 12 carbon atoms and can be alkyl, cycloalkyl, aryl, as well as combinations thereof such as aralkyl, alkaryl, cycloalkylaryl, and the like; M is a metal selected from Groups 2b, 4a, and 5a of the Periodic Table, *Handbook of Chemistry and Physics*, 49th edition, page B-3, Chemical Rubber Company, Cleveland, Ohio (1968). X is a halogen, or —OR, —SR, and —N(R)$_2$ of which R is as just defined; and z is an integer equal to the valence of M. The organometal compounds of Group 4a are preferred in our invention, and compounds of tin and lead are the more preferred.

These new terminating compounds replace the terminal reactive metal group with the $R_{(z-1)}M$— group. Thus, to achieve the desired improvements of this invention in the properties of the gum stocks and filled stocks containing these polymers, it is believed necessary that the newly formed $R_{(z-1)}M$— terminal groups be present in the recovered polymers. Depending on the nature of the metal M, these new terminal groups can vary considerably in hydrolytic and oxidative stability. Therefore, when M is zinc or cadmium the polymers with the newly formed $R_{(z-1)}M$— terminal groups should be recovered with as little exposure to air and water as possible, especially at elevated temperatures. On the other hand, if M is tin or lead, the polymers of this invention can be recovered and dried under the usual conditions employed for solution polymerized rubbery polymers of conjugated dienes without apparent loss in the improvements obtained according to this invention.

The amount of the $R_{(z-1)}MX$ compound employed in the reaction with the polymers containing the reactive terminal metal group is generally in the range of from 0.01 to 1.10 equivalents of $R_{(z-1)}MX$ per equivalent of the initiator employed for the polymerization.

The $R_{(z-1)}MX$ compound generally is added to the polymerization system after substantially all of the monomer or monomers have polymerized. However, it is possible to add the compound continuously or incrementally during the polymerization step. This latter procedure provides a product of broadened molecular weight distribution since $R_{(z-1)}MX$ effectively terminates a growing polymer molecule by replacement of the active metal terminal group with the $R_{(z-1)}M$— group.

The temperatures employed for the reaction of the $R_{(z-1)}MX$ organometal compound with the polymers containing the terminal reactive metal group generally are in the range of from −30° C. to about 150° C. and can in many cases be the same temperature as that employed for the polymerization step. The reaction time employed for the reaction is generally in the range of from about one minute to about 48 hours or longer, though usually a time of from 0.25 to 2 hours is sufficient.

Since polymerization mixtures often are very viscous, it is within the scope of the practice of our invention to reduce the viscosity of polymerization mixtures prior to the addition of the $R_{(z-1)}MX$ organometal compound by any suitable means. For example, the polymerization mixture can be diluted with additional inert diluent; or small amounts of certain nonreactive polar compounds such as ethers, thioethers or tertiary amines can be added to reduce the viscosity of the polymerization mixture. The reduced viscosity promotes rapid and efficient reaction of the $R_{(z-1)}MX$ reagent with the terminal reactive metal groups on the polymers.

The following examples demonstrate various aspects of the instant invention. Specific materials used in the examples should be considered as illustrative of our invention and not as limitative of the scope thereof.

EXAMPLE I

Polybutadienes were prepared according to our invention by employing a multilithium initiator and triphenyl germanium bromide, tri-n-butyltin chloride or triphenyl lead-bromide organometal as terminating agents. The polymerization recipe and results are shown below.

Table I

| Run No. | Initiator meqhm | Terminating Agent Type | mhm | Metal[a] Content, wt. % |
|---|---|---|---|---|
| 1 | 1.6 | (n-Bu)₃SnCl | 1.6 | 0.15 |
| 2 | 2.0 | (φ)₃GeBr | 2.0 | 0.11 |
| 3 | 2.0 | (φ)₃PbBr | 2.0 | 0.35 |
| 4[b] | 2.0 | — | — | — |

[a]Determined by x-ray fluorescence technique.
[b]Control run, terminated with isopropyl alcohol.

The polymers above were compounded employing the recipe shown below and the properties given in Table II below.

| Compounding Recipe | Parts by weight |
|---|---|
| Polymer | 100 |
| Dutrex 726[a] | 10 |
| IRB No. 2[b] | 50 |
| Zinc oxide | 3.0 |
| Stearic Acid | 2.0 |
| Sulfur | 1.75 |
| Santocure NS[c] | 0.8 |

[a]Aromatic hydrocarbon from petroleum: sp. gr. 0.991; viscosity, 83 SUS at 210°F.
[b]Industry Reference Black No. 2, a high abrasion furnace black.
[c]N-tert-Butyl-2-benzothiazolesulfenamide.

Table II

| | Polymer, Run No. | | | |
|---|---|---|---|---|
| | 1 (Sn) | 2 (Ge) | 3 (Pb) | 4 (control) |
| Mooney viscosity[a] | | | | |
| Raw | 35 | 36 | 19 | 30 |
| Compounded | 164 | 76 | 187 | 62 |
| Bound Rubber,[b]% | 51 | 22 | 59 | 19 |
| (Cured 35 minutes at 293°F) | | | | |
| Tensile[c], psi | 1645 | 2410 | 1895 | 2140 |
| Elongation,[c]% | 250 | 470 | 255 | 460 |
| Resilience,[d]% | 79.2 | 71.6 | 78.4 | 70.3 |

[a]ASTM D 1646-63.
[b]Determined by taking 0.1 g sample of the mill mixed compound, placing said sample in a steel wire screen cage immersed in 100 ml of toluene at about 25°C for one day. At the end of this period the wire cages are removed, dried under vacuum and weighed to determine insoluble material. The amount of insolubilized material is expressed as bound rubber and the percent bound rubber is calculated according to the equation:

$$\frac{(A-B) \cdot 100}{C} = \text{percent bound rubber}$$

wherein A = percent total insoluble material,
B = percent insoluble material in the original compound formulation; and
C = percent polymer (rubber) in the formulation.
[c]ASTM Method D 412-66.
[d]ASTM Method D 945-59.

| Polymerization Recipe | Parts by weight |
|---|---|
| Cyclohexane | 760 |
| 1,3-Butadiene | 100 |
| Initiator[a], meqhm[b] | variable |
| Terminating agent, mhm[c] | variable |
| Polymerization time, hours | 1 |
| Temperature, °C | 50–70 |
| Termination Reaction Time, hours | 0.5–1.0 |
| Temperature, °C | 50 |
| Conversion, % | 100 |

[a]Multilithium initiator prepared by reacting divinylbenzene (DVB) with n-butyllithium (n-BL) at a 0.7/1 mole ratio of DVB/n-BL.
[b]meqhm = gram milliequivalents of lithium per 100 g of monomer.
[c]mhm = gram millimoles of terminating agent per 100 g of monomer.

The results above demonstrate that the polymers of our invention show much greater interaction with carbon black than the control, as determined by bound rubber measurements on the compound stocks. The higher resilience in the vulcanized stocks also demonstrate the polymers of our invention have enhanced polymer-carbon black interaction when compared to the control polymer.

EXAMPLE II

Runs were conducted to show that the results obtained by our invention could not be obtained by merely blending an organotin compound in the compounding recipe. The results of these runs are shown below. The polybutadiene employed in these runs was a commercial polymer identified as Solprene* 200.

This polymer is obtained by the solution polymerization of butadiene with an organometal initiator. The compounding recipe employed in these runs was the same as that used in Example I with the exception that 1 phr of tetrabutyltin (TBT) was added to one formulation while the control contained no added organotin compound. The results of these runs are shown in Table III.

*Trademark

Table III

|  | Polymer Run Number | |
|---|---|---|
|  | 5 | 6 (Control) |
| Tetrabutyltin, phr | 1.0 | — |
| Mooney viscosity |  |  |
| Raw | 59 | 60 |
| Compounded | 83 | 89 |
| Bound Rubber, % | 17 | 18 |
|  | (Cured 35 min. at 293°F) | |
| Tensile, psi | 2655 | 2520 |
| Elongation, % | 575 | 550 |
| Resilience, % | 69.4 | 69.5 |

The results of Table III demonstrate that bound rubber is not increased by merely adding an organotin compound to the corresponding recipe. The lack of enhancement in polymer-carbon black interaction is also reflected in the relatively unchanged physical properties of the vulcanizates.

EXAMPLE III

Other runs were conducted in which polybutadienes prepared with the multilithium initiator of Example I were terminated with tri-n-butyltin chloride and then milled with various fillers. Bound rubber was then determined on the stocks, thus prepared and the appropriate control polymer stocks. The polymerization recipe is shown below and the bound rubber results are shown in Table IV.

Polymerization Recipe

|  | Parts, by weight |
|---|---|
| Cyclohexane | 760 |
| 1,3-Butadiene | 100 |
| Initiator, meqhm | variable |
| Tri-n-butyltin chloride, mhm | variable |
| Polymerization Time, hours | 1.5 |
| Temperature, °C | 50 |
| Termination Reaction Time, minutes | 1–5 |
| Temperature, °C | 25 |

| Run No. | Initiator meqhm | Tri-n-butyltin Chloride mhm | Tin Content, wt. % |
|---|---|---|---|
| 7 | 2.0 | 2.4 | 0.22 |
| 8 | 2.0 | — | — |
| 9 | 2.5 | 1.6 | 0.28 |
| 10 | 2.5 | — | — |

Each of the above polymers was milled for from 5 to 10 minutes at a temperature of about 77°C with 50 parts by weight of filler per 100 parts by weight of polymer. Bound rubber determinations were then made according to the procedure given in Example I with the exception that the samples were allowed to stand for 6 days in toluene rather than 1 day.

Table IV

| Filler | Polymer, Run Number (Percent Bound Rubber) | | | |
|---|---|---|---|---|
| Run No. | −7 | −8 (Control) | −9 | −10 (Control) |
| Philblack* N330[a] | 13.9 | 5.3 | — | — |
| HiSil 233[b] | — | — | 7.5 | 6.5 |
| HiSil 233[b][c] | — | — | 16.4 | 11.8 |
| Graphon[d] | — | — | 14.6 | 4.8 |
| IRB No. 2 | — | — | 20.3 | 6.5 |

[a]Phillips Petroleum Company Carbon Black, Type ASTM D 2516-66T.
[b]Precipitated hydrated silica, sp. gr. 2.0, finer than 325 mesh. Ultimate particle size 0.022 micron.
[c]After mill mixing, the stocks were wrapped in aluminum foil and heated at 100°C for 16 hours.
[d]A product obtained by graphitization of channel black (MPC) at 3200°C whereby surface area is reduced from about 114 m²/g to 94 m²/g.
*Trademark The results shown in Table IV demonstrate the various types of fillers show an enhanced interaction with the polymers of this invention compared to the control polymers which do not contain the organotin terminal groups.

Suitable monomers for preparation of polymers useful in our invention include conjugated dienes having from 4 to 12 carbon atoms per molecule and vinylidene group-containing monomers having from 7 to 20 carbon atoms per molecule. Examples of such monomers include 1,3-butadiene, 2-methyl-1,3-butadiene, 1,3-pentadiene, 1,3-octadiene, 2-phenyl-1,3-butadiene, 3-n-butyl-1,3-octadiene, styrene, 1-vinylnaphthalene, 7-decyl-2-vinylnaphthalene, 2-vinylpyridine, 4-vinylpyridine, 2-vinylquinoline, 3-vinylisoquinoline, and the like. These monomers can be copolymerized to provide the rubbery polymers of this invention. Copolymers can be either random or block in nature.

The monomers can be contacted with any catalyst of the prior art which provides terminal reactive metal groups for further reaction according to this invention. The preferred initiator systems are based on the alkali metals or alkaline earth metals. These preferred initiators can be the metals themselves or more preferably the organoalkali metal compounds or organoalkaline earth metal compounds. Examples of these more preferred initiators include n-butyllithium, sec-butyllithium, tert-butyllithium, n-amylsodium, n-hexylpotassium, calcium anthracene, calcium acenaphthalene, diphenylbarium, phenylsodium, phenyllithium, 1,20-dilithioeicosane, 1,4-dilithiobutane, and the like. Multilithium polymerization initiators such as those obtained by reacting a monolithium compound with a polyfunctional compound such as divinylbenzene can also be employed in the practice of this invention.

The amount of the initiator employed in producing the rubbery polymers having terminal reactive metal groups can vary over a wide range and can be selected based on initiator level-polymer molecular weight relationships known in the art. Generally the amount employed is in the range of from 0.05 to 20 milliequivalents of metal in the initiator per 100 grams of monomer or monomers to be polymerized.

Polymerization conditions known in the art can be employed for the polymerization of the monomers with the initiators. Hydrocarbon diluents are usually employed. Pressures sufficient to maintain the polymerization mixture substantially in the liquid phase are also generally employed. Temperatures in the range of from −50°C to 200°C can be employed and will depend generally on the monomers and initiators chosen. Reaction times can vary over a wide range and will depend in general on the other polymerization reaction parameters. It is preferred that the above parameters be selected such that essentially complete conversion of monomers to polymer is obtained.

Examples of suitable $R_{(z-1)}MX$ compounds include triphenyltin chloride, tri-n-butyltin bromide, tricyclohexyltin fluoride, triethyltin bromide, tri-p-tolyltin iodide, tribenzyltinchloride, tricyclopentylmethyltin fluoride, trimethyltin ethoxide, tridodecyltin bromide, tribenzyl(ethylthio)tin, diethylisobutyltin bromide, ethyldicyclohexyltin chloride, triphenyl(diethylamino)tin, triphenyllead bromide, tricyclohexyllead chloride, trimethyllead dodecoxide, tridecylgermanium iodide, tri-(4-cyclohexylphenyl)germanium methoxide, tribenzylgermanium fluoride, tetraphenyl antimony chloride, tetradecylantimony bromide, tetra-m-tolylbismuth iodide, tetramethylbismuth chloride, methylmercuric iodide, phenylmercuric chloride, cyclohexyl(dodecylthio)mercury, phenylcadmium fluoride, methyl[di(dodecyl)amino]cadmium, dodecylcadmium bromide, benzylcadmium methoxide, phenylzinc bromide, cyclobutylzinc chloride, and the like.

Any of the commonly employed fillers which have some reinforcing ability can be employed with the polymers of our invention in filler loaded stocks. Examples of such fillers include carbon blacks of all types, silicas, titanium dioxide, zinc oxide, calcium carbonate, zinc sulfide, calcium silicate, hydrated alumina, calcined magnesia, and various types of clays. Mixtures of these fillers can be employed and in fact represent a very valuable utility of the polymers of our invention. Because of the enhanced polymer-filler interaction it is possible to employ a mixture of a strongly reinforcing filler with weakly reinforcing filler where previously a strongly reinforcing filler alone would have been required.

Any convenient procedure can be employed for mixing the polymers of this invention with the fillers. Mill mixing of the polymer and filler is a convenient procedure which is well known in the art. It is also possible to form the polymer-filler blend by contacting a solution of the polymer with a slurry of the filler followed by evaporation of the solvent and diluent. In any case, it is preferred that the mixing of the filler and polymers be carried out at a temperature of at least about 70°C in order to promote the polymer-filler interaction. Normally the amount of filler used is from about 0.5 to 400 parts by weight per 100 parts of rubber. Compounding recipes which contain no acidic materials, e.g., employing zinc stearate rather than stearic acid can be employed, if desired.

The polymers of this invention can be compounded with conventional vulcanization agents, vulcanization accelerators, antioxidants, plasticizers, colorants and the like. They can thus be employed for the manufacture of tires of various types, belting, hose, shoe soles, gaskets, and find special utility in wire and cable coating compounds.

Reasonable variations and modifications are possible within the scope of our disclosure without departing from the scope and spirit thereof as disclosed herein in the specification and claims.

We claim:

1. A process for improving the physical properties of polymer containing terminal reactive alkali metal or alkaline earth metal groups the improvement which comprises reacting said polymer containing terminal reactive alkali metal or alkaline earth metal groups with a reagent consisting essentially of an organometal compound represented by the formula $R_{(z-1)}MX$ wherein R is a hydrocarbon radical, M is a metal selected from Groups 2b, 4a, or 5a, X is a radical selected from the group consisting of halogen, —OR, —SR, and —N(R)$_2$, and z is an integer equal to the valence of M, and thereafter admixing a filler with said polymer reacted with said $R_{(z-1)}MX$.

2. The process according to claim 1 wherein filler is selected from the group consisting of carbon black, white carbon, titanium dioxide, zinc oxide, calcium carbonate, zinc sulfide, calcium silicate, hydrated alumina, calcined magnesia, clay, silica, and mixtures.

3. The process according to claim 2 wherein said mixing is carried out at a temperature of at least about 70°C.

4. The process according to claim 1 wherein said M is zinc, cadmium, mercury, germanium, tin, lead, antimony, or bismuth.

5. The process according to claim 4 wherein said M is tin.

6. The process according to claim 4 wherein said organometal compound is triphenyl germanium bromide or triphenyl lead bromide.

7. The process according to claim 4 wherein said M is a metal of said Group 2b and is zinc, cadmium, or mercury.

8. The process according to claim 4 wherein said M is a member of said Group 4a and is germanium, tin, or lead.

9. The process according to claim 4 wherein said M is a member of said Group 5a and is antimony or bismuth.

10. The process according to claim 1 wherein said terminal reactive groups are alkaline earth metal groups.

11. The process according to claim 1 wherein said X is halogen.

12. The process according to claim 1 wherein said X is —OR, —SR, or —N(R)$_2$.

13. The process according to claim 1 employing about 0.5 to 400 parts of said filler by weight per 100 parts of said polymer.

14. A polymer of a monomer selected from the group consisting of conjugated dienes and conjugated dienes with monovinyl-substituted aromatic compounds, wherein said polymer contains at least one terminal $R_{(z-1)}M$- group per polymer molecule and is prepared by reacting a polymer from the defined group which contains a terminal reactive alkali metal or alkaline earth metal group with a reagent consisting essentially of an organometal compound represented by the formula $R_{(z-1)}MX$ wherein R is a hydrocarbon radical containing up to 12 carbon atoms, M is a metal selected from Groups 2b, 4a, and 5a, z is an integer equal to the valence of M, and X is a radical selected from the group consisting of halogen, —OR, —SR, and N(R)$_2$, and wherein said polymer containing said terminal $R_{(z-1)}M$- group further is compounded with a filler selected from the group consisting of carbon black, white carbon, titanium dioxide, zinc oxide, calcium carbonate, zinc sulfide, calcium silicate, hydrated alumina, calcined magnesia, clay, and mixtures thereof.

* * * * *